US007974338B2

(12) United States Patent
Becker et al.

(10) Patent No.: US 7,974,338 B2

(45) Date of Patent: Jul. 5, 2011

(54) SYSTEM FOR DECODING A DIGITAL RADIO STREAM

(75) Inventors: Karl Anton Becker, Karlsbad (DE); Norbert Irnich, Karlsruhe (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 871 days.

(21) Appl. No.: 11/775,421

(22) Filed: Jul. 10, 2007

(65) Prior Publication Data

US 2008/0144710 A1 Jun. 19, 2008

(30) Foreign Application Priority Data

Jul. 11, 2006 (EP) .................................... 06014390

(51) Int. Cl.

*H04B 1/66* (2006.01)
*H04R 25/00* (2006.01)
*G11B 5/09* (2006.01)

(52) U.S. Cl. .......................... 375/240; 381/312; 360/53

(58) Field of Classification Search .................. 375/240; 381/312

See application file for complete search history.

(56) References Cited

U.S. PATENT DOCUMENTS

| | | | | |
|---|---|---|---|---|
| 5,959,259 A * | 9/1999 | Beshears et al. | 177/132 |
| 6,128,257 A * | 10/2000 | Zhou et al. | 369/30.37 |
| 6,782,110 B1 * | 8/2004 | Sigwanz et al. | 381/312 |
| 6,891,690 B2 * | 5/2005 | Asano et al. | 360/53 |
| 7,653,344 B1 * | 1/2010 | Feldman et al. | 455/3.06 |
| 2004/0095666 A1 * | 5/2004 | Asano et al. | 360/53 |
| 2004/0176958 A1 * | 9/2004 | Salmenkaita et al. | 704/275 |
| 2006/0077799 A1 * | 4/2006 | Lee | 369/44.27 |
| 2008/0144710 A1 * | 6/2008 | Becker et al. | 375/240 |

FOREIGN PATENT DOCUMENTS

| | | |
|---|---|---|
| EP | 1551105 * | 9/2003 |
| EP | 1 551 105 A | 7/2005 |
| GB | 2 406 983 A | 4/2005 |

* cited by examiner

*Primary Examiner* — Shuwang Liu
*Assistant Examiner* — Sarah Hassan
(74) *Attorney, Agent, or Firm* — Brinks Hofer Gilson & Lione

(57) ABSTRACT

To improve the user experience, a digital radio receiver may output the data contained within the Fast Access Channel and Service Description Channel of a Digital Radio Mondiale stream when their decoding is complete without waiting for the Main Service Channel decoding to finish. When the Main Service Channel decoding is finished, the digital radio receiver may output the audio or data contained within the Main Service Channel. The audio or data from the Digital Radio Mondiale stream may be output on a speaker, headphones, a display, or other type of transducer. The digital radio receiver may also include a processor and a memory to store data from the Fast Access Channel and the Service Description Channel, including data from previously received Digital Radio Mondiale streams.

19 Claims, 9 Drawing Sheets

SYSTEM FOR DECODING A DIGITAL RADIO STREAM

BACKGROUND OF THE INVENTION

1. Priority Claim

This application claims the benefit of priority from European Patent Application No. 06014390.6, filed Jul. 11, 2006, which is incorporated by reference.

1. Technical Field

The invention relates to digital radio, and in particular, to decoding a digital radio stream.

2. Related Art

Digital radio broadcasting has become more popular because of its availability and superior audio quality compared to traditional analog radio broadcasting. Digital radio broadcasting may include transmission and reception of digital radio streams on existing radio frequency bands, such as Amplitude Modulation (AM) and Frequency Modulation (FM). Digital radio may utilize compression and modulation of audio and data to more effectively take advantage of the bandwidth of AM and FM frequencies. A digital radio stream may include several channels that contain audio, informational data, diagnostic parameters, and other data. For example, the Digital Radio Mondiale (DRM) standard may be broadcast at AM radio bands below 30 MHz. A DRM digital radio stream may include three channels: a Main Service Channel (MSC), a Fast Access Channel (FAC), and a Service Description Channel (SDC).

The MSC channel may contain the data for the DRM services. The MSC channel may contain audio or informational data, depending on the type of service being broadcast. The FAC channel may contain transmission frames that describe the type of services broadcast on the MSC channel. The FAC channel may contain information on the type of modulation, number of services, type of services, and other information to inform a DRM receiver on how to decode the MSC channel. The SDC channel may contain information about a received DRM digital radio stream, such as a radio station identifier, geographic location, time, date, and other information.

Because the MSC channel may contain a large amount of data compressed using a complex compression algorithm, the decoding latency time of the MSC channel may be much greater than the decoding latency time of the FAC and SDC channels. When a user tunes to a new DRM digital radio stream, existing DRM receivers may take time to decode the MSC channel, which may lead to a long delay to hear the audio that is contained in the MSC channel. Moreover, while an existing DRM receiver may simultaneously decode the FAC and SDC channels during MSC channel decoding, such a receiver may not output the data contained in the FAC and SDC channels until the MSC channel decoding is finished. This may result in an unsatisfactory user experience due to the high decoding latency time for the MSC channel. Therefore, a need exists for a system of decoding a digital radio stream with multiple channels to provide a more satisfactory user experience by outputting at least part of the digital radio stream before all the channels are finished decoding.

SUMMARY

A digital radio receiver includes a receiver, a decoder, and a transducer. The receiver receives a digital radio stream, such as a stream conforming to the Digital Radio Mondiale (DRM) standard, and converts the stream into its constituent channels. The channels may include compressed audio and data, or may include other types of data related to the digital radio stream, such as decoding parameters, a radio station identifier, or other information. The decoder decodes the channels into the broadcasted audio and data for output on the transducer. The transducer may include one or more of a speaker, headphones, a text-to-speech converter, a display, or other presentation devices.

The digital radio receiver may concurrently decode the multiple channels, and may complete decoding on the channel containing other types of data before a compressed audio is completely decoded. The digital radio receiver may transmit the data through the transducer before the channel is uncompressed.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A digital radio receiver may decode multiple channels of a received digital radio stream simultaneously. Because a channel containing compressed audio or data may take longer to decode than other channels in the stream, the digital radio receiver may output the content of the other channels before completing decoding of the channel containing compressed audio or data. A user may enjoy an improved user experience because at least part of the digital radio stream may be heard while waiting for decoding of the channel containing compressed audio or data to finish.

The digital radio receiver includes a receiver, a decoder, and a transducer. The receiver may receive a digital radio stream, such as a stream conforming to the Digital Radio Mondiale standard. The receiver may convert the digital radio stream into the individual channels that make up the stream, and the decoder may decode the channels into audio and data for output on the transducer. For example, in a received DRM digital radio stream, the Main Service Channel (MSC) containing compressed audio may take longer to decode than the Fast Access Channel (FAC) or the Service Description Channel (SDC). The digital radio receiver may output the data contained in the FAC or SDC channels before completion of decoding on the compressed audio contained in the MSC channel. In this way, a user has a more satisfactory user experience because at least part of the digital radio stream may be output, i.e., data contained in the FAC or SDC channels, while waiting for decoding of the MSC channel to finish.

The digital radio receiver may include a processor and a memory. When a digital radio stream is received, the processor may access the memory to check whether the memory already contains data related to the digital radio stream. If the memory already contains data related to the digital radio stream, for example, because that particular digital radio stream had been previously received, the processor may output the data from the memory on the transducer. If the memory does not already contain data related to the digital radio stream, then the processor may store the incoming data from the digital radio stream in the memory.

Figure 1:
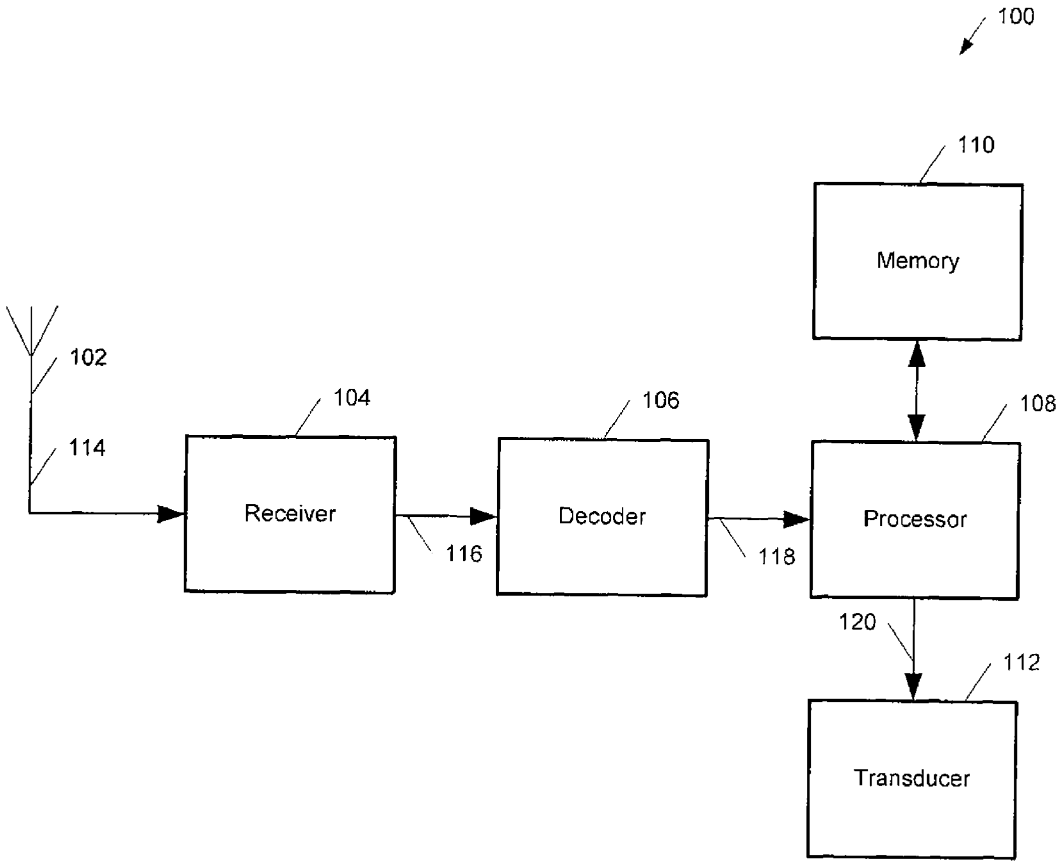
FIG. 1 is a diagram of a digital radio receiver.

FIG. 1 is a diagram of an embodiment of a digital radio receiver 100. The digital radio receiver 100 may include an antenna 102, a receiver 104, a decoder 106, a processor 108, a memory 110, and a transducer 112. More or less components may be included in the digital radio receiver 100. The digital radio receiver 100 may receive a digital radio stream 114 through the antenna 102. The digital radio stream 114 may comprise a radio frequency signal that a radio transmitter broadcast over the air. The digital radio stream 114 may conform to the Digital Radio Mondiale (DRM) standard broadcast at an Amplitude Modulation radio band below about 30 MHz, or may conform to other digital radio standards and/or be broadcast at other frequency bands. The receiver 104 may process the digital radio stream 114 into the channels 116 that constitute the digital radio stream 114. The decoder 106 may decode the channels 116 simultaneously or almost simultaneously to obtain the data 118 contained in the channels 116. Each of the channels 116 may have different decoding latency times, depending on the type of information contained in the channels 116. The data 118 may be provided to the processor 108 for conversion and output on the transducer 112. In addition, the processor 108 may store the data 118 in the memory 110 or may retrieve data in the memory 110 that was previously stored.

The receiver 104 may receive and convert the digital radio stream 114 into channels 116. If the digital radio stream 114 is a DRM digital radio stream, it may include three channels: a Main Service Channel (MSC), a Fast Access Channel (FAC), and a Service Description Channel (SDC). The digital radio stream 114 may include any number of channels 116, whether the digital radio stream 114 is a DRM digital radio stream or a digital radio stream 114 conforming to another digital radio standard. The receiver 104 may include filtering, conversion, and demodulation of the digital radio stream 114 into the channels 116.

The decoder 106 may receive decode the channels 116 into the data 118 that is contained in the channels 116 simultaneously. Because the channels 116 may contain different amounts and types of audio or data that may be compressed with different compression algorithms, the decoding latency time of each of the channels 116 may vary significantly relative to each other. For example, if the digital radio stream 114 is a DRM digital radio stream, there may be three channels: MSC, FAC, and SDC. The MSC channel may contain the largest amount of data of the three DRM channels and may be compressed with a complex compression algorithm. As such, the MSC channel may have the longest decoding latency time compared to the FAC and SDC channels. When the decoder 106 has finished decoding the FAC or SDC channels, the decoder 106 may provide the data 118 corresponding to the FAC or SDC channel to the processor 108, even if the decoder 106 is still decoding the MSC channel. In this system, a user may enjoy an improved user experience because information from the FAC or SDC channels may be heard, before the MSC channel finishes decoding. When the decoder 106 finishes decoding the MSC channel, the data 118 corresponding to the MSC channel may then be provided to the processor 108.

The processor 108 may receive the data 118 from the decoder 106 and store output data 120 in memory 110 or send it to the transducer 112. When a digital radio stream 114 is received, the processor 108 may access the memory 110 to determine whether the memory 110 contains data corresponding to the digital radio stream 114, e.g., if the digital radio stream 114 had been previously received. If the memory 110 contains data corresponding to the digital radio stream 114, the processor 108 may retrieve the data from the memory 110 and provide the output data 120 to the transducer 112. If the memory 110 does not contain data corresponding to the digital radio stream 114, the processor 108 may store the data 118 in the memory 110. In the case where the digital radio stream 114 is a DRM digital radio stream, the processor 108 may access the memory 110 to determine whether there is data corresponding to the FAC or SDC channels for a particular received digital radio stream. If the memory 110 contains FAC or SDC data corresponding to the received DRM digital radio stream, then the FAC or SDC data may be provided as the output data 120 to the transducer 112. If the memory 110 does not contain FAC or SDC data corresponding to the received DRM digital radio stream, then the data 118 from the decoder 106 may be stored in the memory 110.

The transducer 112 may receive and output the output data 120. The transducer 112 may include one or more of a text-to-speech converter, a speaker, headphones, a display, or other devices that can convey the output data 120 to the user. The output data 120 may correspond to the MSC, FAC, or SDC channels of a DRM digital radio stream. If the output data 120 corresponds to the MSC channel and contains audio, the audio may be output on a speaker, headphones, or other audio transducer. If the output data 120 corresponds to the FAC or SDC channels and contains data, the data may be output on a display or other video transducer, or may be converted by the text-to-speech converter and output on a speaker, headphones, or other audio transducer.

Figure 2:
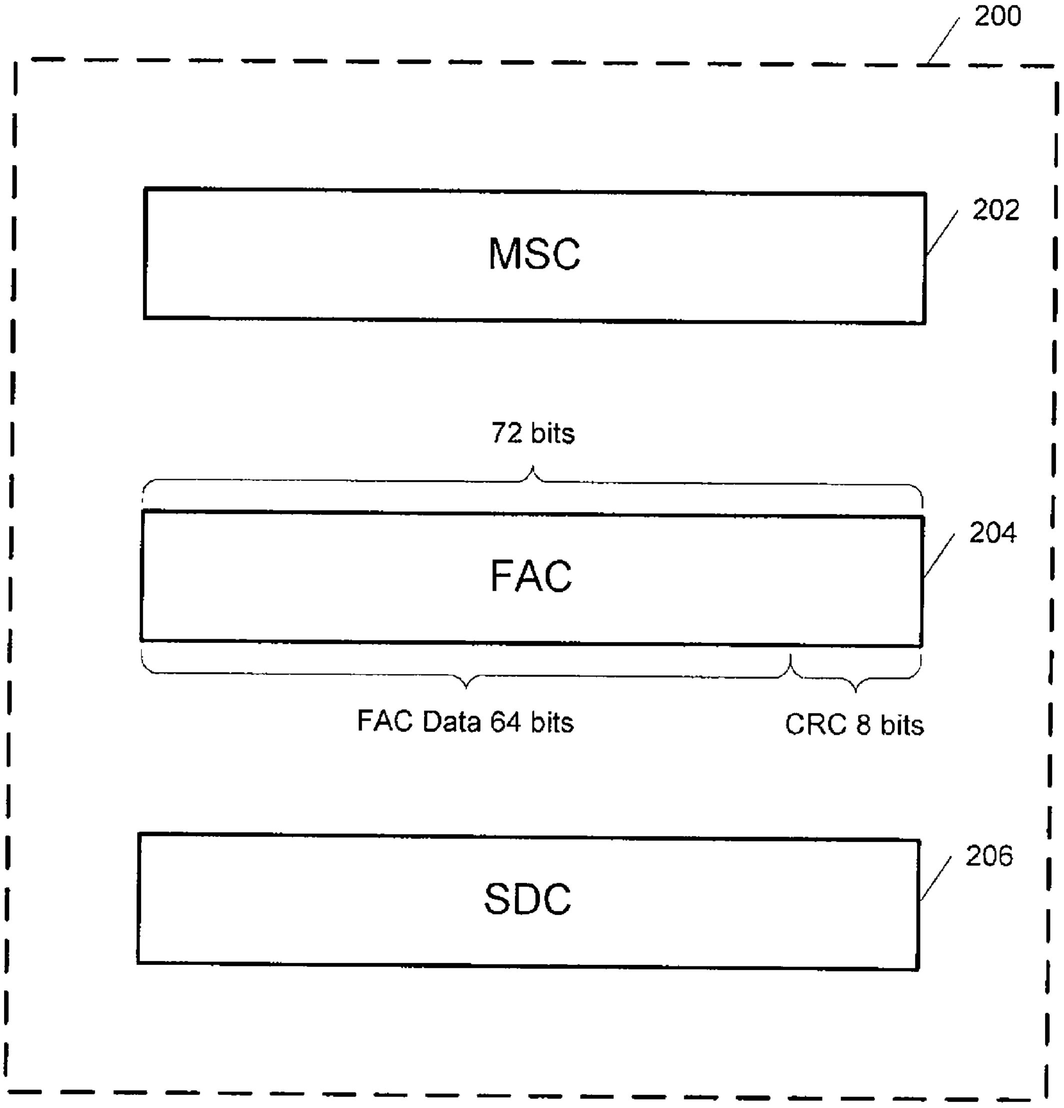
FIG. 2 is a diagram of a Digital Radio Mondiale digital radio stream.

FIG. 2 represents a Digital Radio Mondiale digital radio stream 200. The DRM digital radio stream 200 may include three channels: the Main Service Channel (MSC) 202, the Fast Access Channel (FAC) 204, and the Service Description Channel (SDC) 206. The MSC channel 202 may contain the data for all the possible services within the DRM standard, such as compressed audio or data. A DRM digital radio stream may contain between one and four services, with each service including audio or data, and the MSC channel 202 may include the primary data for each service. The MSC channel 202 may contain the largest amount of data of the three DRM channels and be compressed with a complex compression algorithm. Thus, the MSC channel 202 may have the longest decoding latency time. A MSC channel 202 containing audio may comprise compressed audio frames, and three compressed audio frames may comprise a superframe. Audio on the MSC channel 202 may be compressed using algorithms such as MPEG4 AAC for music or MPEG4 CELP for speech. Other compression algorithms may be used to compress audio or data on the MSC channel 202.

The FAC channel 204 may contain transmission frames that describe the services contained in the MSC channel 202. The FAC channel 204 may include information on how to decode the rest of the DRM digital radio stream, including the MSC channel 202. Such information may include spectrum occupancy, interleaving scheme, modulation mode, the number of services, language, audio, data, program type, spectrum occupancy, transmission mode, or other parameters. The FAC channel 204 may contain 72 bits of information, with 64 bits of FAC data and 8 bits for a cyclic redundancy check (CRC). Regardless of the spectrum occupancy or transmission mode, the decoder 106 may decode the FAC channel 204 to determine how to decode the rest of the DRM digital radio stream.

The SDC channel 206 may contain information about the available services in the DRM digital radio stream and further information on how to decode the MSC channel 202. The SDC channel 206 may also include data that may be conveyed to the user of a digital radio receiver, such as a radio station identifier, time, date, geographic location, or other information.

Figure 3:
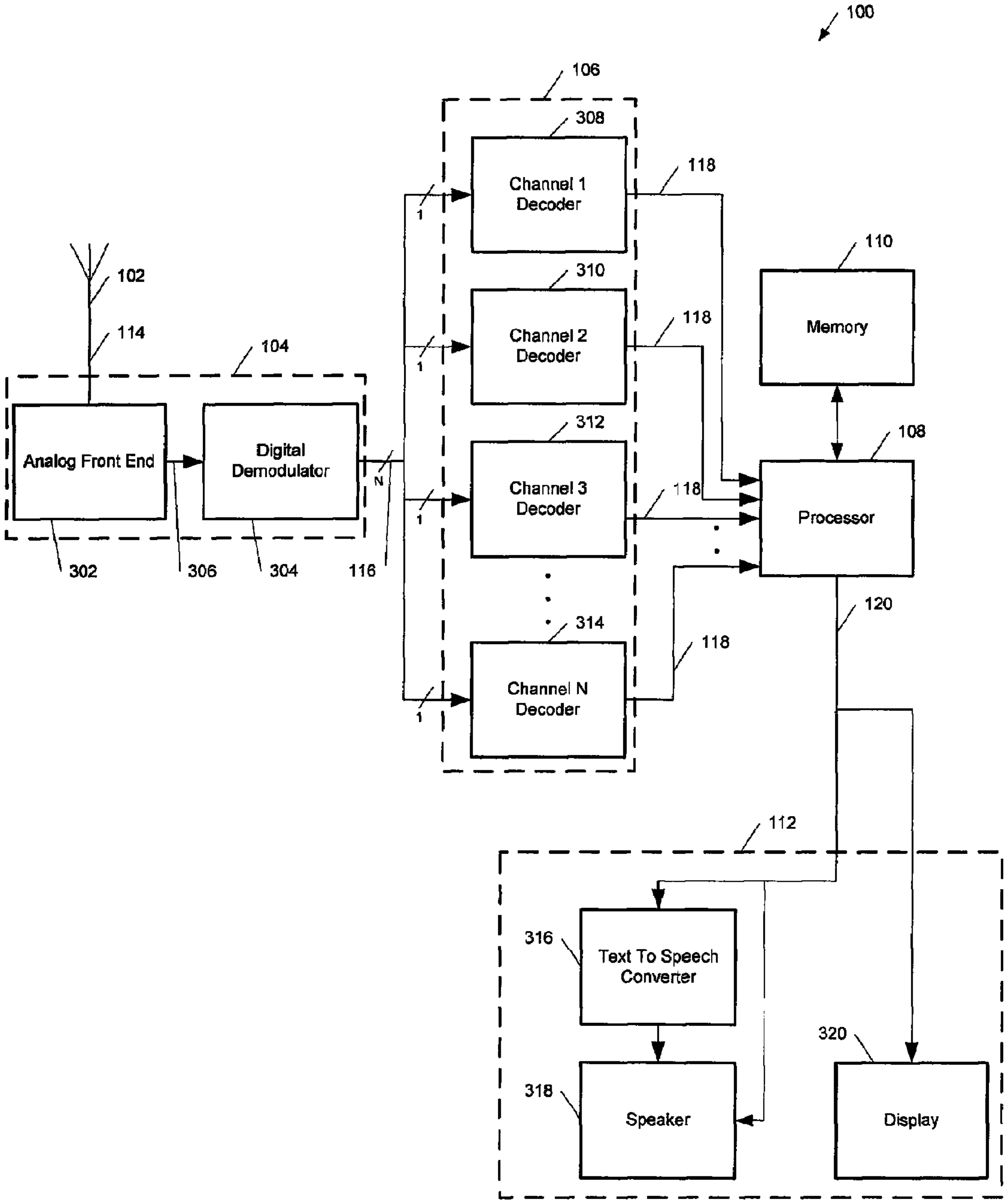
FIG. 3 is a diagram of the digital radio receiver of FIG. 1.

FIG. 3 is a digital radio receiver 100. Analog receiver 104 may receive and convert the digital radio stream 114 into channels 116, and may include an analog front end 302 and a digital demodulator 304. The analog front end 302 receives the digital radio stream 114 and may down convert, filter, and convert the digital radio stream 114 to an intermediate digital signal 306. The analog front end 302 may comprise a combination of passive and/or active components. The analog front end 302 may perform other operations on the digital radio stream 114 to obtain the intermediate digital signal 306. The digital demodulator 304 receives the intermediate digital signal 306 and may perform carrier synchronization, timing synchronization, and equalization to output the channels 116 as multiplexed data. The channels 116 may be time, frequency, or amplitude multiplexed. The digital demodulator 304 may comprise a combination of passive and/or active components to demodulate the intermediate digital signal 306 into the channels 116.

The decoder 106 may receive and decode the channels 116 into the data 118, and may include a plurality of individual decoders 308, 310, 312, and 314 connected in parallel that correspond to each of the channels 116. Any number of individual decoders may be included in the decoder 106 to correspond to the number of channels 116. In FIG. 3, there are N channels 116 and a corresponding number of N individual decoders 308, 310, 312, and 314. The individual decoders 308, 310, 312, and 314 may each include decoding logic to decode the channels 116 into the data 118. The individual decoders 308, 310, 312, and 314 may be separate decoders or may be combined into a single unit. Any decoding scheme may be used to decode the channels 116. Each of the channels 116 decoded in the individual decoders 308, 310, 312, and 314 may have different decoding latency times. Regardless of the decoding latency time for a particular channel 116, the individual decoders 308, 310, 312, or 314 may provide the data 118 to the processor 108 once the individual decoder has completed decoding of the particular channel 116.

When a digital radio stream 114 is received, the processor 108 may access the memory 110 to determine whether the memory 110 contains data corresponding to the digital radio stream 114, e.g., if the digital radio stream 114 had been previously received. If the memory 110 contains data corresponding to the digital radio stream 114, the processor 108 may retrieve the data from the memory 110 and provide the output data 120 to the transducer 112. If the memory 110 does not contain data corresponding to the digital radio stream 114, the processor 108 may instead store the data 118 in the memory 110.

The transducer 112 may receive and output the output data 120, and may include a text-to-speech converter 316, a speaker 318, and a display 320. The output data 120 may include audio, text, or other data to be conveyed to a user of the digital radio receiver 100. If the output data 120 includes audio, the processor 108 may output the audio to the speaker 318 for presentation. If the output data 120 includes text, the processor 108 may output the text to the display 320 for presentation. The processor 108 may also output the text to the text-to-speech converter 316, which may then present the text as speech through the speaker 318.

Figure 4:
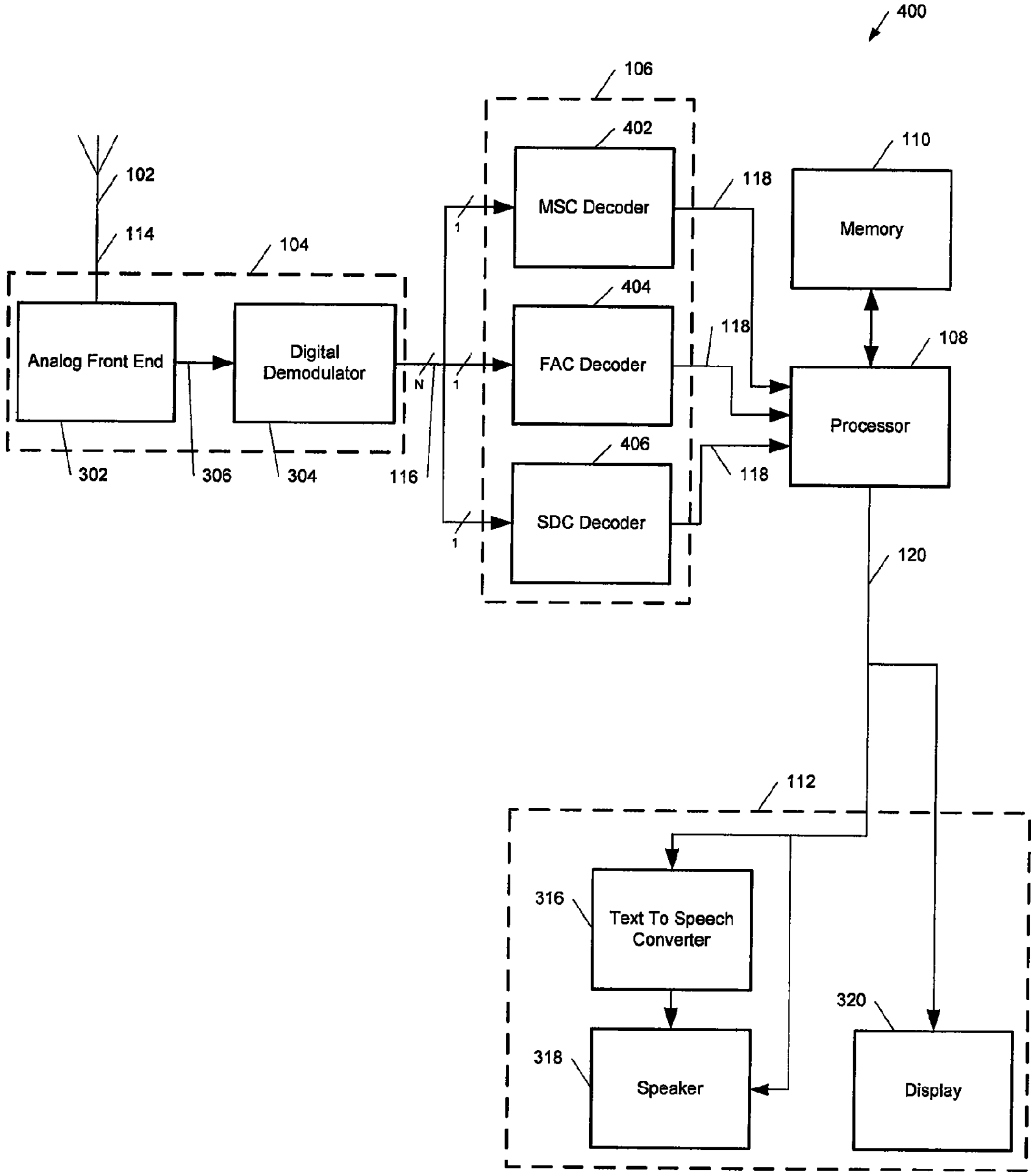
FIG. 4 is a diagram of a Digital Radio Mondiale receiver.

FIG. 4 is a digital radio receiver 400 compatible with the Digital Radio Mondiale standard. The digital radio receiver 400 in FIG. 4 includes an antenna 102, a receiver 104 including an analog front end 302 and digital demodulator 304, a decoder 106, a processor 108, a memory 110, and a transducer 112. The decoder 106 in FIG. 4 includes three decoders 402, 404, and 406 for each of the MSC, FAC, and SDC channels of the DRM digital radio stream 114. As in the digital radio receiver 100 in FIGS. 1 and 3, the receiver 104 may receive and convert the digital radio stream 114 into channels 116 using the analog front end 302 and the digital demodulator 304. The decoder 106 receives and decodes the channels 116 into the data 118. Because the digital radio stream 114 conforms to the DRM standard, the digital radio stream 114 contains the MSC, FAC, and SDC channels, and the individual decoders 402, 404, and 406 may respectively decode each channel. The individual decoders 402, 404, and 406 may be separate units or may be combined as a single unit.

Because of its greater amount of data and compression with a complex compression algorithm, the MSC channel may have a longer decoding latency time in MSC decoder 402, relative to the FAC decoder 404 and the SDC decoder 406. However, instead of waiting for all the decoders 402, 404, and 406 to complete decoding, the FAC decoder 404 and the SDC decoder 406 may output their respective data 118 when finished decoding the FAC and SDC channels. In this fashion, the data contained in the FAC and SDC channels may be provided to the user when the FAC and SDC decoders 404 and 406 complete decoding, even if the MSC decoder 402 is still decoding. This may result in an improved user experience because the user will not have to wait until the MSC channel is decoded to receive at least the information contained in the FAC and SDC channels.

When the processor 108 receives a DRM digital radio stream 114, the processor 108 may access the memory 110 to determine whether the memory 110 contains data corresponding to the FAC or SDC channels of the DRM digital radio stream 114. There may be data in the memory 110 corresponding to the FAC or SDC channels if the received DRM digital radio stream 114 had been previously received. If the memory 110 contains FAC or SDC data corresponding to the received DRM digital radio stream 114, the processor 108 may retrieve the data from the memory 110 and provide it as the output data 120 to the transducer 112. If the memory 110 does not contain FAC or SDC data corresponding to the received DRM digital radio stream 114, the processor 108 may instead store the FAC or SDC data 118 in the memory 110.

The transducer may receive and output the output data 120, and may include a text-to-speech converter 316, a speaker 318, and a display 320. The output data 120 may include audio or data from the MSC, FAC, or SDC channels. In particular, if the MSC channel contains audio that was decoded in the MSC decoder 402, the processor 108 may output the audio to the speaker 318 for presentation. If the FAC or SDC channels contain text that was decoded in the FAC or SDC decoders 404 and 406, the processor 108 may output the text to the display 320 for presentation, or may output the text to the text-to-speech converter 316 for subsequent speech output on the speaker 318. The processor 108 may output the text from the FAC or SDC channels immediately after completing decoding in the FAC or SDC decoders 404 and 406 without waiting until the MSC channel is completely decoded. This process may result in an improved user experience because the user will at least receive the information from the FAC and/or SDC channels without having to wait until the MSC channel is decoded.

Figure 5:
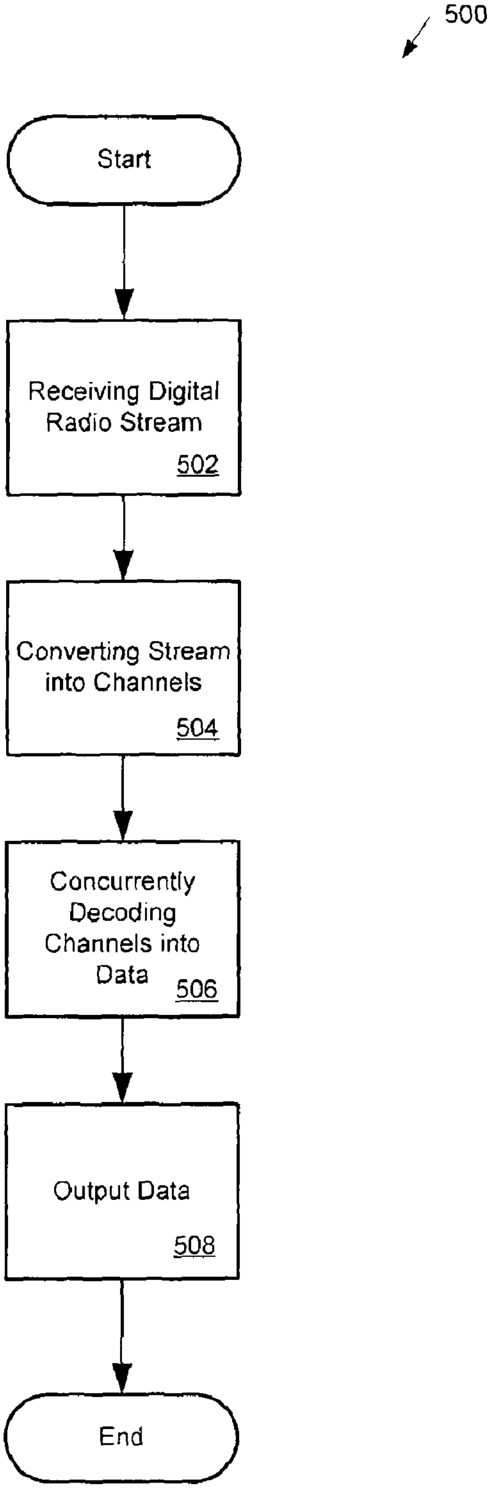
FIG. 5 is a process of decoding a digital radio stream.

FIG. 5 is a process 500 of decoding a digital radio stream. In Act 502, a digital radio stream may be received. The digital radio stream may be received by a digital radio receiver at an antenna from a broadcaster over the air, or may be received through a wired connection, a computer, a network, or another form of reception. The digital radio stream may conform to the Digital Radio Mondiale (DRM) standard or another digital radio standard. The digital radio stream may be converted into its constituent channels in Act 504. For example, a DRM digital radio stream may include a Main Service Channel (MSC), Fast Access Channel (FAC), and a Service Description Channel (SDC). Each channel may contain audio or data related to the digital radio stream. In Act 506, the channels may be concurrently decoded into their respective data. In a DRM digital radio stream, a MSC channel may include the primary audio or data being broadcast on the digital radio stream, a FAC channel may include information about how to decode the MSC channel, and a SDC channel may include information related to the content of the MSC channel. Although all of the channels may be concurrently decoded, the MSC channel may have the longest decoding latency time because it may contain the largest amount of data and be compressed using a complex compression algorithm. In Act 508, the data from the channels of the digital radio stream are output. For a DRM digital radio stream, if the decoding of the FAC or SDC channels is completed before the decoding of the MSC channel, the data from the FAC or SDC channels may be output first. Once the decoding of the MSC channel is complete, the audio or data from the MSC channel may be output.

Figure 6:
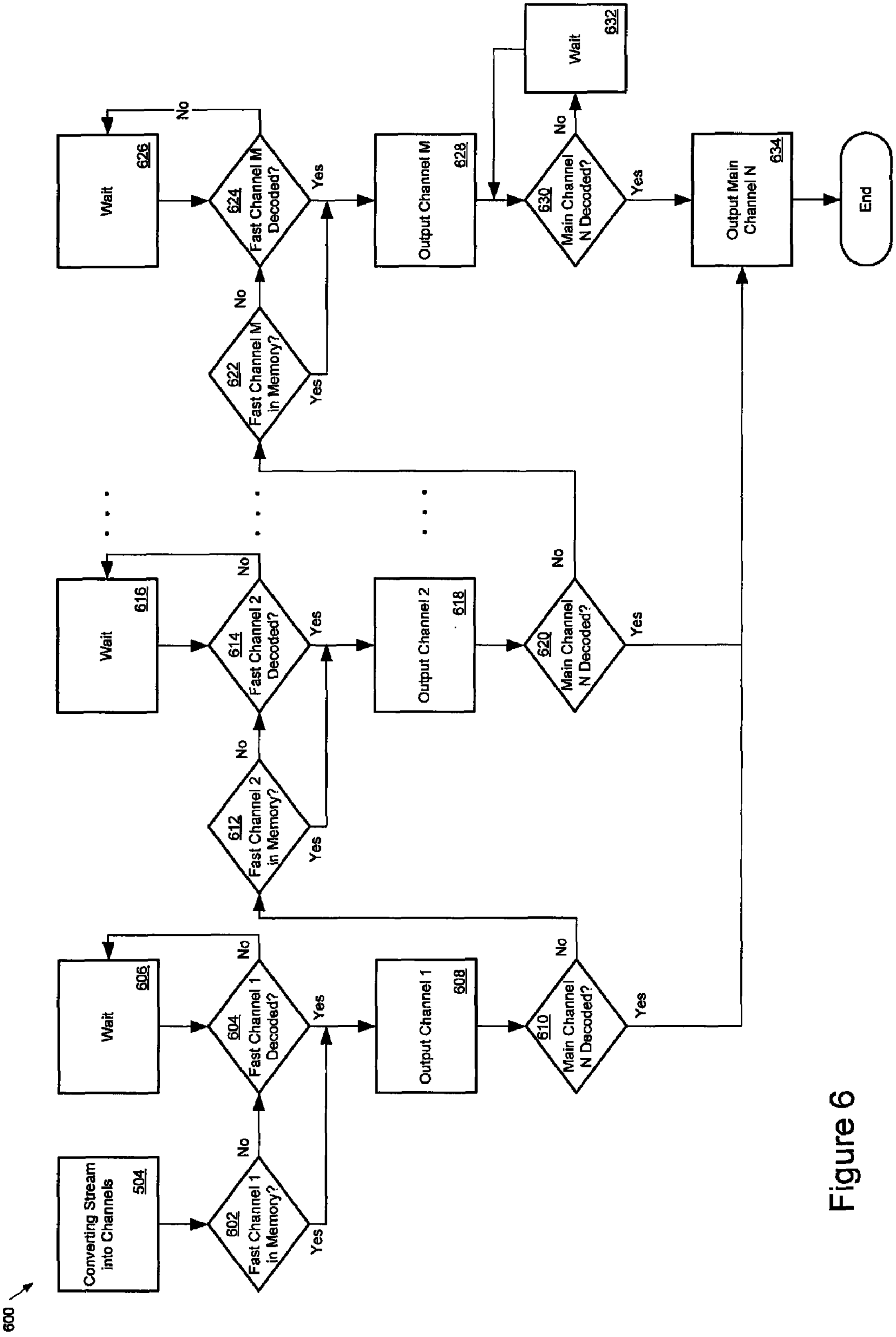
FIG. 6 is a process of decoding a digital radio stream with multiple channels.

FIG. 6 is a process 600 of decoding a digital radio stream with multiple channels. The process 600 may include the Acts 506 and 508. The process 600 may follow the conversion of a digital radio stream into their constituent channels in Act 504. The digital radio stream in process 600 may include M number of channels, including a main channel N with a longer decoding latency time relative to the decoding latency times of the other M channels. In Act 602, a memory is accessed to determine whether data corresponding to a first channel is in the memory. The first channel may have a shorter decoding latency time relative to the decoding latency time of the main channel N. If data corresponding to the first channel is not in the memory, then decoding of the first channel may begin and the process 600 continues to Act 604. In Act 604, if decoding of the first channel is not finished, then the process 600 waits for a predetermined time in Act 606 and then returns to Act 604 to again check if decoding of the first channel is finished. When the decoding of the first channel is completed in Act 604, then the decoded data from the first channel may be output on a transducer in Act 608.

If the data corresponding to the first channel is present in the memory in Act 602, then that data may be output on a transducer in Act 608 without waiting for the decoding of the first channel to finish. After output of the data corresponding to the first channel, the process 600 continues to Act 610 to determine whether decoding of the main channel N is finished. In Act 610, if decoding of the main channel N is not finished, then the process 600 continues to Act 612 for the second channel. But in Act 610, if decoding of the main channel N is finished, then the audio or data corresponding to the main channel N is output in Act 634 on a transducer.

The process 600 continues to Act 612 if decoding of the main channel N is not finished in Act 610. In Act 612, a memory is accessed to determine whether data corresponding to a second channel is in the memory. The second channel may have a shorter decoding latency time relative to the decoding latency time of the main channel N. If data corresponding to the second channel is not in the memory, then decoding of the second channel may begin and the process 600 continues to Act 614. In Act 614, if decoding of the second channel is not finished, then the process 600 waits for a predetermined time in Act 616 and then returns to Act 614 to again check if decoding of the second channel is finished. When the decoding of the second channel is completed in Act 614, then the decoded data from the second channel may be output on a transducer in Act 618.

However, if the data corresponding to the second channel is present in the memory in Act 612, then that data may be output on a transducer in Act 618 without waiting for decoding of the second channel to finish. The transducer may be one or more of a speaker, headphones, a display, a text-to-speech converter, or other audio or video transducers. After output of the data corresponding to the second channel, the process 600 continues to Act 620 to determine whether decoding of the main channel N is finished. In Act 620, if decoding of the main channel N is not finished, then the process 600 continues to Act 622 for the next channel M. But in Act 620, if decoding of the main channel N is finished, then the audio or data corresponding to the main channel N is output in Act 634 on a transducer.

The process 600 may continue for the number of channels that comprise the digital radio stream. In FIG. 6, there are M number of channels in the digital radio stream. The process 600 may continue to Act 622 if decoding of the main channel N is not finished in Act 620. In Act 622, a memory is accessed to determine whether data corresponding to a channel M is in the memory. The channel M may have a shorter decoding latency time relative to the decoding latency time of a main channel N. If the data corresponding to the channel M is not in the memory, then decoding of the channel M may begin and the process 600 continues to Act 624. In Act 624, if decoding of the channel M is not finished, then the process 600 waits for a predetermined time in Act 626 and then returns to Act 624 to again check if decoding of the channel M is finished. When the decoding of the channel M is completed in Act 624, then the decoded data from the channel M may be output on a transducer in Act 628.

On the other hand, if the data corresponding to the channel M is present in the memory in Act 622, then that data may be output on a transducer in Act 628 without waiting for decoding of the channel M to finish. After output of the data corresponding to the channel M, the process 600 continues to Act 630 to determine whether decoding of the main channel N is finished. In Act 630, if decoding of the main channel N is not finished, then the process 600 continues to Act 632 and waits for a predetermined time and returns to Act 630 to again check if decoding of the main channel N is finished. If decoding of the main channel N is finished in Act 630, then the audio or data corresponding to the main channel N is output in Act 634 on a transducer.

Figure 7:
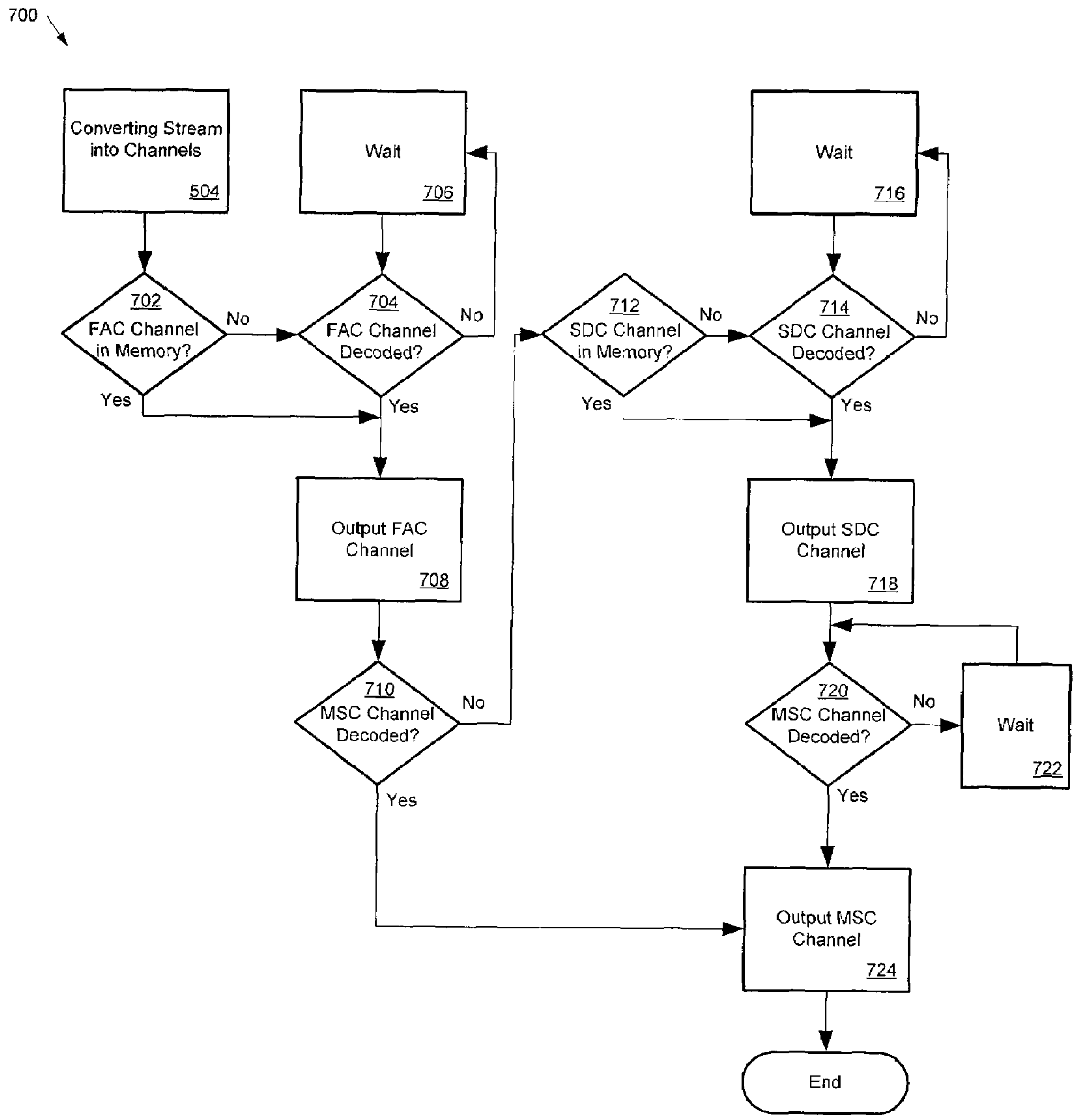
FIG. 7 is a process of decoding a Digital Radio Mondiale digital radio stream.

FIG. 7 is a process 700 of decoding a Digital Radio Mondiale (DRM) digital radio stream. The process 700 may include the Acts 506 and 508. The process 700 may follow the conversion of a digital radio stream into their constituent channels in Act 504. A DRM radio stream in process 700 may include a Main Service Channel (MSC), a Fast Access Channel (FAC), and a Service Description Channel (SDC). The decoding latency time of the MSC channel may be greater than the decoding latency time of the FAC and SDC channels. In Act 702, a memory is accessed to determine whether data corresponding to the FAC channel is in the memory. If data corresponding to the FAC channel is not in the memory, then decoding of the FAC channel may begin and the process 700 continues to Act 704. In Act 704, if decoding of the FAC channel is not finished, then the process 700 waits for a predetermined time in Act 706 and then returns to Act 704 to again check if decoding of the FAC channel is finished. When the decoding of the FAC channel is completed in Act 704, then the decoded data from the FAC channel may be output on a transducer in Act 708.

However, if the data corresponding to the FAC channel is present in the memory in Act 702, then that data may be output on a transducer in Act 708 without waiting for the decoding of the FAC channel to finish. After output of the data corresponding to the FAC channel, the process 700 continues to Act 710 to determine whether decoding of the MSC channel is finished. In Act 710, if decoding of the MSC channel is not finished, then the process 700 continues to Act 712 and checks the SDC channel. But in Act 710, if decoding of the MSC channel is finished, then the audio or data corresponding to the MSC channel is output in Act 724 on a transducer.

The process 700 continues to Act 712 if decoding of the MSC channel is not finished in Act 710. In Act 712, a memory is accessed to determine whether data corresponding to the SDC channel is in the memory. The SDC channel may have a shorter decoding latency time relative to the decoding latency time of the MSC channel. If data corresponding to the SDC channel is not in the memory, then decoding of the SDC channel may begin and the process 700 continues to Act 714. In Act 714, if decoding of the SDC channel is not finished, then the process 700 waits for a predetermined time in Act 716 and then returns to Act 714 to again check if decoding of the SDC channel is finished. When the decoding of the SDC channel is completed in Act 714, then the decoded data from the SDC channel may be output on a transducer in Act 718.

If the data corresponding to the SDC channel is present in the memory in Act 712, then that data may be output on a transducer in Act 718 without waiting for decoding of the SDC channel to finish. The transducer may be one or more of a speaker, headphones, a display, a text-to-speech converter, or other audio or video transducers. After output of the data corresponding to the SDC channel, the process 700 continues to Act 720 to determine whether decoding of the MSC channel is finished. In Act 720, if decoding of the MSC channel is not finished, then the process 700 continues to Act 722 and waits for a predetermined time and returns to Act 720 to again check if decoding of the MSC channel is finished. If decoding of the MSC channel is finished in Act 720, then the audio or data corresponding to the MSC channel is output in Act 724 on a transducer.

Figure 8:
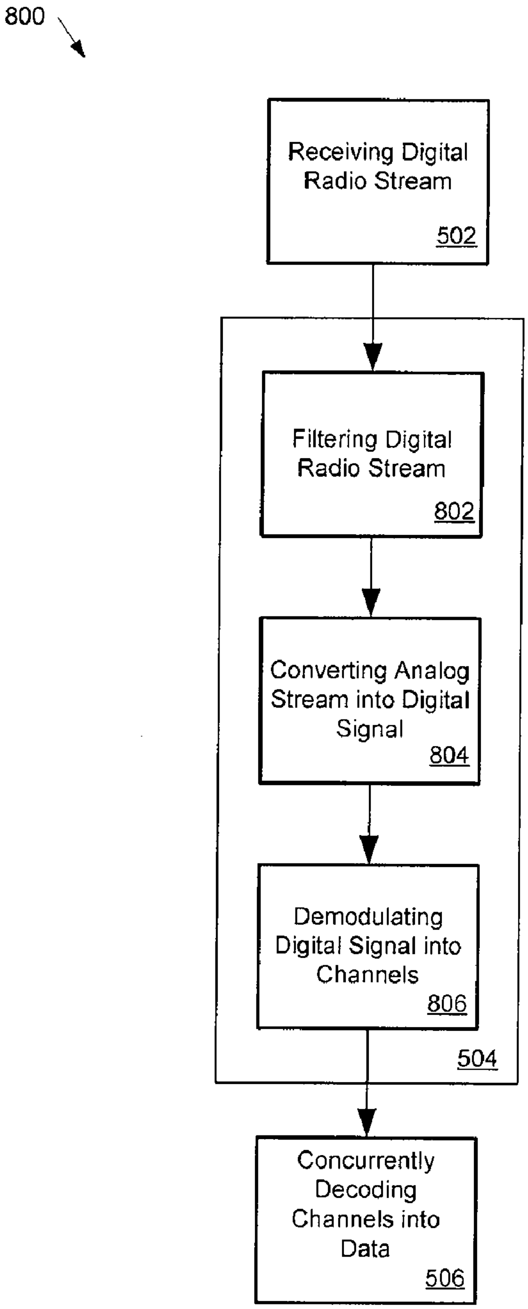
FIG. 8 is a process of converting a digital radio stream into multiple channels.

FIG. 8 is a process 800 of converting a digital radio stream into multiple channels. The process 800 may follow the reception of a digital radio stream in Act 502 and may provide channels for decoding in Act 506. In Act 802, the digital radio stream from Act 502 may be filtered. The digital radio stream may be an analog radio frequency signal and the filtering in Act 802 may remove noise and other anomalies from the digital radio stream. A low pass filter, high pass filter, other type of filter, or any combination of active and/or passive components may filter the DRM digital radio stream as desired in Act 802. In Act 804, the digital radio stream may be converted to an intermediate digital signal. An analog-to-digital converter or other combination of active and/or passive components to convert an analog signal to a digital signal may be used in Act 804. In Act 806, the intermediate digital signal from Act 804 may be demodulated into the channels comprising the digital radio stream. The demodulation may perform carrier synchronization, timing synchronization, and equalization to output the multiplexed channels. The multiplexed channels may be time, frequency, or amplitude multiplexed. The channels may be provided to Act 506 for decoding into the data contained within the channels.

Figure 9:
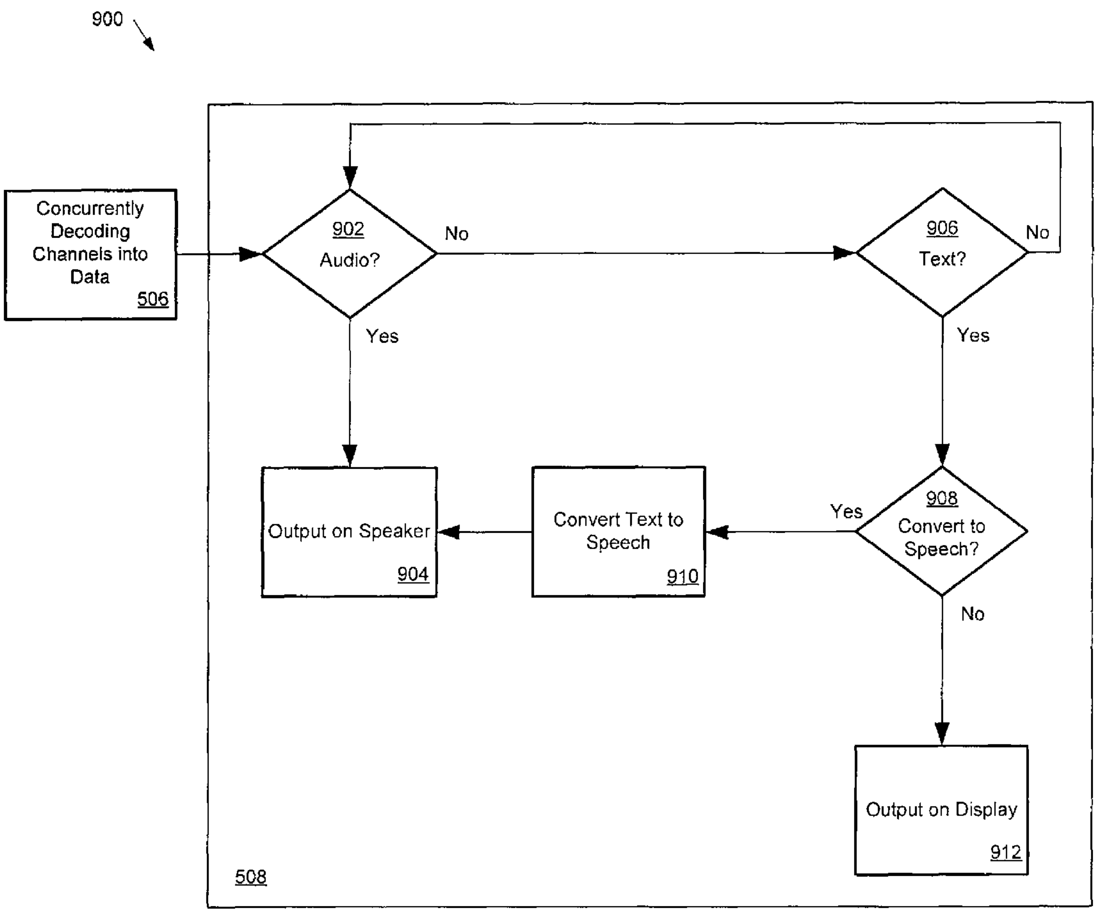
FIG. 9 is a process of outputting data encoded in a digital radio stream.

FIG. 9 is a process 900 of outputting data encoded in a digital radio stream. The process 900 may follow the concurrent decoding of channels into data in Act 506. In Act 902, the data from Act 506 is checked to see if the data contains audio. If the data contains audio, then the process 900 continues to Act 904 and the audio is output on a speaker. The audio may also be output on headphones or other type of audio transducer in Act 904. If the data does not contain audio in Act 902, then the process 900 continues to Act 906 to check if the data contains text. If the data does not contain text in Act 906, then the process 900 returns to Act 902 to examine the next incoming data from Act 506. However, if the data contains text in Act 906, then Act 908 checks whether it is desired to convert the text to speech for output. In Act 908, if it is desired to convert the text to speech, then the process 900 continues to Act 910. The text in the data may be converted to speech in Act 910 using a text-to-speech synthesis component, algorithm, or process. The process 900 may continue to Act 904 to output the speech on a speaker. However, if it is not desired to convert the text to speech in Act 908, then the process 900 may continue to Act 912. The text may be output on a display in Act 912, such as on an LCD display screen or on any other transducer that can display the text.

The processes may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are depicted as being stored in memories, all or part of the systems, including processes and/or instructions for performing processes, consistent with the system for decoding a digital radio stream may be stored on, distributed across, or read from other machine-readable media, for example, secondary storage devices such as hard disks, floppy disks, and CD-ROMs; a signal received from a network; or other forms of ROM or RAM, some of which may be written to and read from in a vehicle.

Specific components of a system for decoding a digital radio stream may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A digital radio receiver, comprising:

a receiver adapted to receive a digital radio stream and convert the digital radio stream into a first channel and a second channel, the digital radio stream comprising a radio frequency signal, and the first and second channels comprising digital signals;

a decoder in communication with the receiver, the decoder adapted to concurrently decode the first channel in a first latency time to obtain a first data and concurrently decode the second channel in a second latency time to obtain a second data, where the second latency time is greater than the first latency time;

a transducer in communication with the decoder, the transducer adapted to output the first and second data;

a memory; and a processor in communication with the decoder, the memory, and the transducer, the processor adapted to access the memory when the digital radio stream is received to determine whether the memory has stored the first data from previously receiving the digital radio stream, wherein the processor is adapted to provide the stored first data to the transducer when the first data is previously stored in the memory, and adapted to store the first data in the memory when the first data is not present in the memory;

where the first data is output on the transducer after the decoder decodes the first channel and while the decoder is decoding the second channel, and the second data is output on the transducer after the decoder decodes the second channel.

2. The digital radio receiver of claim 1, where the transducer comprises one or more of a speaker, text-to-speech converter, headphones, or a display.

3. The digital radio receiver of claim 1, where the digital radio stream comprises a Digital Radio Mondiale digital radio stream, the Digital Radio Mondiale digital radio stream comprising a Main Service Channel, a Fast Access Channel, and a Service Description Channel.

4. The digital radio receiver of claim 3, where the first channel comprises the Fast Access Channel or the Service Description Channel, and the second channel comprises the Main Service Channel.

5. The digital radio receiver of claim 1, where the second channel comprises one or more of compressed audio or compressed data.

6. The digital radio receiver of claim 1, where the receiver comprises:

an analog front end adapted to filter and perform analog-to-digital conversion of the digital radio stream into an intermediate digital signal; and a digital demodulator in communication with the analog front end, the digital demodulator adapted to demodulate the intermediate digital signal into the first and second channels.

7. The digital radio receiver of claim 6, where the digital demodulator is further adapted to synchronize, equalize, and multiplex the intermediate digital signal into the first and second channels.

8. The digital radio receiver of claim 1, where the decoder comprises a plurality of individual decoders for each of the first and second channels.

9. The digital radio receiver of claim 1, further comprising an antenna in communication with the receiver, the antenna adapted to receive the digital radio stream.

10. A method of decoding a digital radio stream, comprising:

receiving the digital radio stream;

converting the digital radio stream into a first channel and a second channel, where the digital radio stream comprises a radio frequency signal, and the first and second channels comprise digital signals;

decoding the first channel into a first data and the second channel into a second data, where the first channel is decoded in a first latency time, the second channel is decoded in a second latency time, and the second latency time is greater than the first latency time;

accessing a memory when the digital radio stream is received to determine whether the first data related to the digital radio stream has previously been received and stored in the memory;

outputting the first data when the first data is previously stored in the memory;

storing the first data in the memory before outputting the first data when the first data is not previously stored in the memory; and outputting the second data, where the first data is output after the first channel has been decoded and before the second channel has been decoded, and the second data is output after the second channel has been decoded.

11. The method of claim 10, where outputting the first and second data comprises outputting on one or more of a speaker, text-to-speech converter, headphones, or a display.

12. The method of claim 10, where the digital radio stream comprises a Digital Radio Mondiale digital radio stream, the Digital Radio Mondiale digital radio stream comprising a Main Service Channel, a Fast Access Channel, and a Service Description Channel.

13. The method of claim 12, where the first channel comprises at least one of the Fast Access Channel or the Service Description Channel, and the second channel comprises the Main Service Channel.

14. The method of claim 10, where the second channel comprises one or more of compressed audio or compressed data.

15. The method of claim 10, where converting the digital radio stream into a first channel and a second channel comprises:

filtering the digital radio stream;

converting the digital radio stream from an analog signal into an intermediate digital signal; and demodulating the intermediate digital signal into the first and second channels.

16. The digital radio receiver of claim 15, where demodulating the intermediate signal comprises synchronizing, equalizing, and multiplexing the intermediate digital signal into the first and second channels.

17. The method of claim 10, where concurrently decoding comprises decoding the first and second channels individually.

18. The method of claim 10, where receiving the digital radio stream comprises receiving the digital radio stream on an antenna.

19. A digital radio receiver, comprising:

receiving means for receiving a digital radio stream;

converting means for converting the digital radio stream into a first channel and a second channel;

decoding means for concurrently decoding the first channel into a first data in a first latency time and the second channel into a second data in a second latency time, where the second latency time is greater than first latency time;

transducer means for outputting the first and second data, where the first data is output on the transducer means after the decoding means decodes the first channel and while the decoding means is decoding the second channel, and the second data is output on the transducer means after the decoding means decodes the second channel;

accessing means for accessing a memory when the digital radio stream is received to determine whether the first data to the digital radio stream was previously received and present in the memory;

storing means for storing the first data in the memory when the first data related to the digital radio stream is not present in the memory; and outputting means for outputting the first data from the memory when the first data is present in the memory.

* * * * *